United States Patent [19]

Belfort

[11] 4,362,873

[45] Dec. 7, 1982

[54] PROCESS FOR THE PREPARATION OF BASIC OXAZINE DYESTUFFS

[75] Inventor: Gérard L. A. Belfort, Oissel, France

[73] Assignee: P C U K Produits Chimiques Ugine Kuhlmann, Courbevoie, France

[21] Appl. No.: 246,979

[22] Filed: Mar. 24, 1981

[30] Foreign Application Priority Data

Apr. 18, 1980 [FR] France .................. 80 08723

[51] Int. Cl.³ .......................... C09B 19/00
[52] U.S. Cl. .................... 544/103; 544/102
[58] Field of Search .................. 544/103, 102

[56] References Cited

U.S. PATENT DOCUMENTS

| | | | |
|---|---|---|---|
| 2,741,605 | 4/1956 | Zwilgmeyer ................... | 544/103 |
| 3,681,347 | 8/1972 | Herz et al. ................... | 544/103 X |
| 3,806,504 | 4/1974 | Mundlos et al. ............... | 544/103 |
| 3,894,014 | 7/1975 | Baumann et al. .............. | 544/103 |
| 3,928,339 | 12/1975 | Mundlos et al. .............. | 544/103 |

FOREIGN PATENT DOCUMENTS

| | | | |
|---|---|---|---|
| 2294209 | 7/1976 | France ........................ | 544/103 |
| 2317336 | 2/1977 | France ........................ | 544/103 |
| 2431520 | 2/1980 | France ........................ | 544/103 |

*Primary Examiner*—Floyd D. Higel
*Attorney, Agent, or Firm*—Beveridge, DeGrandi and Kline

[57] ABSTRACT

The invention relates to a process for the preparation of dyestuffs of the formula:

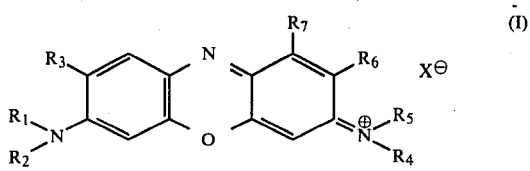

in which $R_1$ represents hydrogen, alkyl, alkenyl or aralkyl, $R_2$ represents alkyl, alkenyl, cycloalkyl, aryl or aralkyl, $R_3$ represents hydrogen, alkyl or alkoxy, $R_4$ represents hydrogen, alkyl, aryl or aralkyl, $R_5$ represents hydrogen or alkyl, $R_6$ represents hydrogen, alkyl or alkoxy, $R_7$ represents hydrogen or alkyl or forms with $R_6$ a condensed benzene ring, and $X^\ominus$ represents an anion, which process comprises reacting a nitroso compound of formula (II) with an aminophenol of formula (III) or a nitroso compound of formula (IV) with a compound of formula (V):

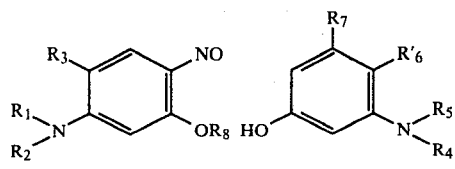

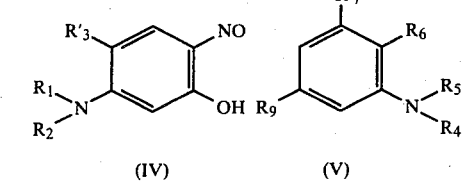

in which $R_1$ to $R_7$ have the same meanings as above, $R'_3$, $R'_6$ and $R'_7$ each represents H or alkyl, $R_8$ is a possibly substituted alkyl radical, and $R_9$ is an alkoxy radical or a possibly substituted amino group. The reaction is effected in the presence of an anhydride such as acetic anhydride and the dyestuffs may be prepared without heating with excellent yields.

17 Claims, No Drawings

PROCESS FOR THE PREPARATION OF BASIC OXAZINE DYESTUFFS

The present invention relates to a new process for the preparation of basic oxazine dyestuffs which may be represented by the general formula:

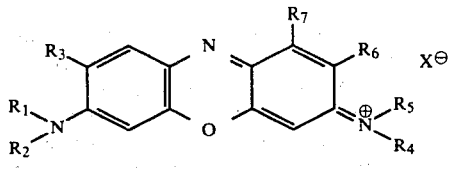

in which $R_1$ represents a hydrogen atom or a possibly substituted alkyl, alkenyl or aralkyl radical, $R_2$ represents a possibly substituted alkyl, alkenyl, cycloalkyl, aryl or aralkyl radical, $R_3$ represents a hydrogen atom or an alkyl or alkoxy radical, $R_4$ represents a hydrogen atom or a possibly substituted alkyl, aryl or aralkyl radical, $R_5$ represents a hydrogen atom or a possibly substituted alkyl radical, $R_6$ represents a hydrogen atom or an alkyl or alkoxy radical, $R_7$ represents a hydrogen atom or an alkyl radical or forms with $R_6$ a condensed benzene ring, and $X^\ominus$ represents an anion.

In this formula, the preferred alkyl and alkoxy radicals are those containing 1 to 4 carbon atoms. Some examples of possible substituents for the alkyl radicals which $R_1$, $R_2$, $R_4$ and $R_5$ may represent are the halogen atoms and the hydroxy, cyano, carbamoyl, alkoxy or alkoxycarbonyl groups. When $R_1$, $R_2$ or $R_4$ represents an aryl or aralkyl radical, the latter is preferably a phenyl or benzyl radical and may carry usual substituents such as: halogen, alkyl, trifluoromethyl, cycloalkyl, hydroxy, alkoxy, aralkoxy, cycloalkoxy, aryloxy, carboxy, acyl, acyloxy, acylamino, acylalkoxycarbonyl, nitro, cyano, carbamoyl, sulfamoyl, amino, alkylamino, dialkylamino, arylamino, mercapto, alkylmercapto, arylmercapto, alkylsulfonyl and arylsulfonyl. The inorganic or organic anion $X^\ominus$ may be the one supplied directly by the preparation process or may proceed from a subsequent anion exchange reaction; more particular examples of anions are the chloride, sulfate, nitrate, phosphate, formiate, acetate, propionate, oxalate, lactate, tartrate, thiocyanate, perchlorate, chlorozincate, benzoate, nitrobenzoate, benzene- or toluene- or naphthalene-sulfonate, sulfomethylate, sulfoethylate, carbonate and bicarbonate anions.

The nitrosation of mono- or di-substituted aromatic amines and the reaction of the obtained nitroso compounds with meta-aminophenols or their alkyl ethers or also with meta-phenylenediamines to obtain cationic derivatives of phenoxazine constitute a well-known sequence of operations, amply described in the literature (see Psaar and Heitzer, Chem. Ber. 102, 3603–3604 (1969); French Pat. Nos. 2,036,034; 2,045,397; 2,099,211; 2,121,198; 2,124,306; 2,171,260; 2,268,842; 2,294,209; 2,317,336 and 2,357,603; Eurpoean Patent Application 0 005 451). Of the foregoing, French Pat. No. 2,099,211 corresponds to U.S. Pat. No. 4,009,162; French Pat. No. 2,121,198 corresponds to U.S. Pat. No. 3,806,504; French Pat. No. 2,171,260 corresponds to U.S. Pat. No. 3,894,012; French Pat. No. 2,317,336 corresponds to British Pat. No. 1,550,868; and French Pat. No. 2,357,603 corresponds to U.S. Pat. No. 4,125,717. Thus, the dyestuffs of formula (I) may be prepared by reacting in aqueous and/or organic medium:

(a) a nitroso compound of formula (II) with an aminophenol of formula (III):

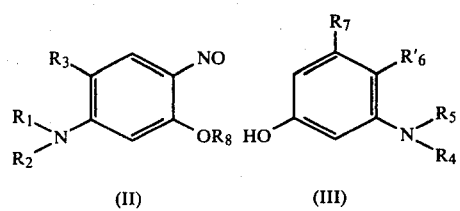

in which the symbols $R_1$ to $R_5$ and $R_7$ have the same meanings as above, $R'_6$ represents a hydrogen atom or an alkyl radical and $R_8$ represents a possibly substituted alkyl radical, or (b) a nitroso compound of formula (IV) with a compound of formula (V):

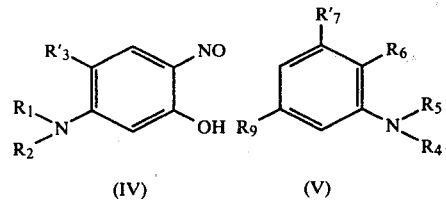

in which the symbols $R_1$, $R_2$, $R_4$, $R_5$ and $R_6$ have the same meanings as above, $R'_3$ and $R'_7$ each represents a hydrogen atom or an alkyl radical, and $R_9$ represents an alkoxy radical or an amino group possibly substituted by one or two alkyl radicals.

However, the known processes all have the disadvantage of necessitating that the operation be conducted at a high temperature, for example in an aliphatic alcohol maintained at reflux so that the condensation-cyclization reaction may occur rapidly. The preparation of the dyestuffs of formula (I) therefore necessitates, on an industrial scale, a complicated apparatus with a reduced capacity, a conducting of the operation which may be dangerous and especially costly energy to bring the reagents to the reaction temperature and to maintain them there. Moreover, the known use of metallic salts, particularly zinc chloride, in this type of reaction does not permit the formation of the dyestuff to be brought about at low temperature.

It has now been found that the dyestuffs of formula (I) may be prepared in simple vats and without heating, thus with a saving of energy and important time and with an increase in the unitary capacity of synthesis, when the reaction is effected in the presence of an anhydride of carboxylic acid of the formula:

in which Y and Y' are identical or different and each represents a linear or ramified alkyl radical, containing 1 to 6 carbon atoms and possibly substituted by halogen atoms, or a phenyl radical which may carry up to three substituents chosen from among the halogen atoms and the nitro, alkyl and alkoxy groups, one of the symbols Y and Y' being able also to represent a hydrogen atom, this anhydride being used in a quantity at least equal to the stoichiometry.

Some examples of anhydrides of formula (VI) to be used according to the invention are acetoformic, propionic, butyric, isobutyric, valeric, isovaleric, hexanoic, chloroacetic, trifluoroacetic, trimethylacetic or benzoic anhydrides and, quite particularly, the acetic anhydride which is a product of current manufacture; a mixture of anhydrides may also, obviously, be used. To obtain a complete reaction, it is generally sufficient to use the stoichiometric quantity of anhydride. However, in certain cases, this proportion may be slightly increased up to attaining three times the stoichiometric quantity; the use of a quantity of anhydride greater than this last propertion is useless, but it is not disadvantageous to the process and therefore remains consistent with the present invention.

Also included within the scope of the present invention is the case where the anhydride is formed in situ, for example by the action of a carboxylic acid halide, such as, for example, acetyl chloride, on an alkali metal salt of carboxylic acid, such as for example sodium acetate.

Conducting the process according to the invention is generally very simple; it comprises mixing at ambient temperature, in a liquid medium which plays the role of dissolvent or dispersant, a nitroso compound of formula (II) or (IV) with respectively a compound of formula (III) or (V), then, without its being necessary to raise the temperature, bringing about the formation of the dyestuff by the addition of an anhydride of formula (VI). Once the reaction is completed, generally controlled by the absence of the initial nitroso compound, the obtained phenoxazinium salt may then be separated according to known methods.

According to one variant of the above mode of operation, a variant which is frequently used and which also gives very good results, a compound of formula (III) or (V) and the anhydride of formula (VI) are mixed into the diluent, then the nitroso compound of formula (II) or (IV) is introduced therein in solid form or also in the form of a solution or of a suspension in a diluent.

The nitroso compounds of formulae (II) and (IV) may be used either in the form of their salts, for example chloride, sulfate or chlorozincate, or in the form of non-salified amine. In this latter case, the phenoxazinium salt obtained after condensation-cyclization contains the anion which corresponds to the used carboxylic anhydride of formula (VI) and which is converted into acid during the formation reaction of the dyestuff; thus, another advantage with the process according to the invention is to be able to supply directly the carboxylic acid salts of the basic oxazine dyestuffs, salts which are very desirable for their use in dyeing because of their very high solubility in water.

The nitroso compounds of formulae (II) and (IV) may also be prepared in the condensation-cyclization medium itself, i.e. without its being necessary to isolate them from their formation medium before their reaction with any one of the compounds (III) or (V). Thus, according to one mode of operation according to the invention, a compound of the formula:

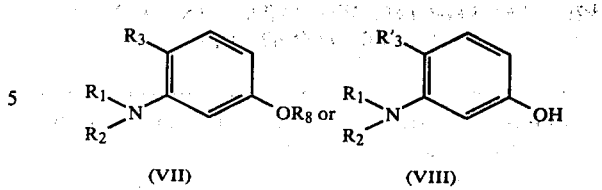

in the dissolved or dispersed form in a diluent, may be treated in a known manner, at a temperature between 0° and 20° C. by an alkali metal nitrite in the presence of an inorganic or organic acid, then, when the formation of the nitroso compound is terminated, this compound is subjected directly to the above-described condensation-cyclization reaction. This synthesis process often constitutes a preferred mode of operation on an industrial scale because it is very simple and prevents the manufacturing staff from being exposed to the toxicity of certain nitroso compounds. When this mode of operation is being conducted, it is necessary to see that, before the condensation-cyclization reaction is undertaken, the pH of the medium is adjusted, if necessary, for example, in a range extending from 1 to 7, and to see that any excess nitrite is eliminated. The pH may be regulated by means of an inorganic or organic base, for example an oxide, a hydroxide, a carbonate, a bicarbonate, an acetate, an ethanolamine or an alkylamine, or also by the addition of buffer substances, for example a phosphate. The elimination of any possibly excess nitrite may be effected by means of decomposition with urea or amidosulfonic acid, or also by adding again a little of the compound to be nitrosed of formula (VII) or (VIII).

The process according to the invention may sometimes be advantageously conducted in the presence of a metallic salt. In fact, although the use of a metallic salt, which is known per se for this type of condensation, is totally inadequate to bring about the formation of the dyestuff at low temperature, it has been unexpectedly ascertained that certain metals intensify the action of the anhydrides of formula (VI). This synergic effect is of great interest in the case where the reactivity of the compounds of formula (II) or (IV) with the compounds of formula (III) or (V) is low; it therefore permits the preparation of increased yields of certain oxazine dyestuffs which are difficult to synthetise.

Some examples of metallic salts which are usable according to the invention are those of the following metals: magnesium, cobalt, iron, manganese, aluminum, copper, titanium, and, very particularly, zinc. The metallic salt may just as well be an inorganic salt (in particular a halide, a sulfate, a nitrate, a phosphate, a carbonate, a bicarbonate, a chromate, a bichromate, a thiocyanate, a borate, a fluoroborate, a perchlorate) as any organic salt (in particular an aliphatic or aromatic carboxylic acid salt, for example a formiate, an acetate and its halogenated derivatives, an oxalate, a tartrate, a stearate, a gluconate, a benzoate, a naphthionate, or also a sulfonic acid salt such as a benzene-, toluene- or naphthalene-sulfonate). Zinc chloride is a metallic salt which is often preferred. According to the invention, the metallic salt may possibly be formed in situ, for example by the attack of a metallic oxide or hydroxide by means of the acid possibly present in the reaction medium. The quantity of metallic salt to be used may vary in wide proportions and depends upon the reactivity of the compounds to be condensed and also upon the operational conditions; the optimal quantity may be easily determined by preliminary tests.

The metallic salt may be introduced or formed in the reaction medium either at the time of the formation of the nitroso compound if the latter is not isolated, or at the very time of the condensation reaction.

When the condensation of the compounds of formulae (II) and (IV) with respectively the compounds of formulae (III) and (V) is effected according to the invention at ambient temperature in the presence of an anhydride, the joint use of a metallic salt may lead immediately to the metallic complexes derived from the corresponding quinone diimines. It has in fact been ascertained that certain of these complexes are stable so that the speed of the cyclization reaction which must follow to form the oxazine cycle is possibly low, even zero. In addition, and especially when a zinc salt is used, certain complexes are scarcely soluble in the condensation medium so that they may be isolated and even dried. Analysis of these metallic complexes shows that, according to the reagents used, they probably correspond to the following formulae:

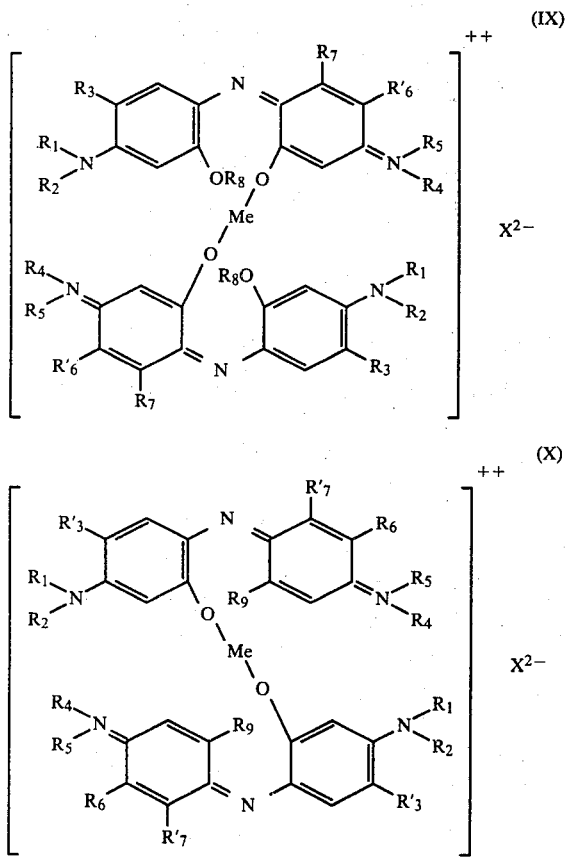

in which the symbols $R_1$ to $R_9$ and $X$ have the same meanings as given above and Me represents the introduced metal atom.

The formation of these complexes is not at all disadvantageous to the preparation of the basic oxazine dyestuffs according to the process of the invention. In fact, these stable metallic complexes, whether they be isolated or not, may, in any event, be easily converted into dyestuffs of formula (I); practically, it is sufficient to treat them at ambient temperature, in neutral to slightly alkaline (pH 9) medium, with a compound capable of precipitating or complexing the metal contained in the organic complex so that the cyclization reaction occurs immediately. The basic oxazine dyestuff which results therefrom may then be isolated from the medium according to known methods. Some examples of compounds which, by means of an exchange reaction, are capable of isolating from the medium in the form of an insoluble salt the metal contained in the intermediate organo-metallic complexes, which greatly accelerates in certain cases the cyclization into oxazine dyestuffs, are principally inorganic compounds such as alkali metal hydroxides, carbonates, bicarbonates, sulfides, thiocyanates and chromates. Sulfonic and carboxylic acids or hydroxyaromatic compounds and also their salts are also suitable. Compounds which are capable of forming with the metal very stable complexes, whether the latter be soluble or insoluble, are also suitable, such as, for example, the sodium salt of ethylenediaminetetraacetic acid. The phosphates of sodium, potassium and especially ammonium are to be very highly recommended because these compounds precipitate all the above-mentioned metals and because they bring about a generally very rapid cyclization reaction.

As a liquid medium (diluent) to dissolve or disperse the reagents when the process according to the invention is being conducted, more particularly water, an aliphatic alcohol (preferably an alcohol with a low molecular weight such as methanol, ethanol, propanol, isopropanol, butanol), an aromatic alcohol (for example benzyl alcohol), or a cyclo-aliphatic alcohol (for example cyclohexanol), a glycol (for example ethyleneglycol and diethyleneglycol), a glycol ether (for example the monomethyl, monoethyl or monobutyl ether of ethyleneglycol), an aliphatic carboxylic acid (preferably an acid with a low molecular weight such as formic, acetic, propionic and lactic acids), a cyclic ether (for example dioxan and tetrahydrofuran), formamide or an N-alkylamide (for example dimethylformamide, dimethylacetamide, N-methylpyrrolidone or the triamide of hexamethylphosphoric acid), a sulfoxide (for example dimethylsulfoxide), a sulfone (for example tetramethylene sulfone) a nitrile (for example acetonitrile), a ketone (for example acetone, methylethylketone, methylisobutylketone), pyridine, or a mixture of any one of these solvents, in particular a hydro-organic mixture, whether these solvents are miscible or non-miscible one with the other, may be used.

Because of their industrial significance, the following are preferably used:

1. as compounds of formula (II), those in which $R_1$ and $R_2$ are methyl, ethyl, β-cyanethyl, β-hydroxyethyl, β-hydroxypropyl, β-chloroethyl or β-alkoxyethyl radicals, $R_3$ is a hydrogen atom or a methyl or ethyl radical and $R_8$ is a methyl, ethyl, hydroxymethyl, β-hydroxyethyl or β-hydroxypropyl radical;

2. as compounds of formula (III), those in which $R'_6$ and $R_7$ are hydrogen atoms, $R_4$ is a hydrogen atom or a methyl or ethyl radical and $R_5$ is a methyl, ethyl, phenyl, tolyl, hydroxyphenyl or methoxyphenyl radical;

3. as compounds of formula (IV), those in which $R_1$ and $R_2$ are methyl, ethyl or possibly substituted phenyl radicals; and 4. as compounds of formula (V), those in which $R_4$ and $R_5$ are hydrogen atoms, $R_6$ is a methyl, methoxy or ethoxy radical, $R'_7$ is a hydrogen atom and $R_9$ is an $NH_2$ group or a methoxy or ethoxy radical.

The following examples, in which the parts and percentages indicated are parts and percentages by weight, unless otherwise stated, illustrate the invention without limiting it.

EXAMPLE 1

Introduced successively into an open container provided with an agitator and a thermometer are 27 parts of acetic acid, 27 parts of 3-methoxy-diethylaniline, 30 parts of fragmented ice and 21.6 parts of zinc chloride. With stirring and within the space of approximately 30 minutes, 20.8 parts by volume of an aqueous 50% solution of sodium nitrite are poured in while maintaining the temperature between 15° and 18° C. by the addition of ice. After stirring for 30 minutes, 25.4 parts of 3-diethylamino-phenol are added to the solution of nitroso compound thus obtained, then 15.5 parts of acetic anhydride are poured in within one hour while constantly maintaining the temperature at 25° C. by the addition of ice. The condensation reaction is practically instantaneous and therefore occurs as and when the anhydride is introduced. Stirring is still effected for 15 to 30 minutes, then the intermediate metallic complex is filtered which, scarcely soluble in water, has crystallized during the addition of the anhydride and it is washed with 350 parts of water containing 7 parts of sodium chloride. This metallic complex weighs 100 parts in its wet form and probably has the following structure:

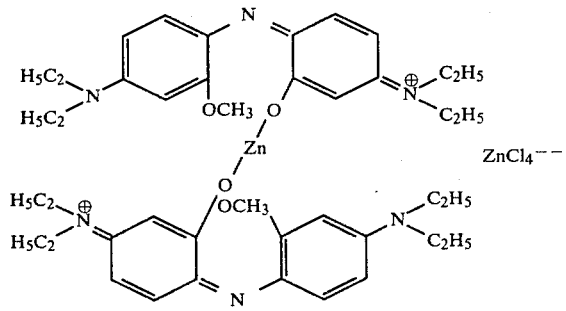
(XI)

| | Elementary analysis of the dry product: | | | | |
|---|---|---|---|---|---|
| | C % | H % | Zn % | Cl % | N % |
| Calculated | 51.28 | 5.90 | 13.3 | 14.44 | 8.54 |
| Found | 51.76 | 5.70 | 14.56 | 14.55 | 8.16 |

The cyclization of this metallic complex is effected in an open container containing 45 parts of water and 20.8 parts of diammonium hydrogen phosphate. Within an hour, with stirring and without heating, i.e. at 20°–25° C. approximately, the 100 wet parts of the previously isolated metallic complex are introduced, then stirring is again effected for one hour while checking by thin layer chromatography the reduction then the absence of the metallic complex (XI) and the formation of the corresponding oxazine dyestuff.

To isolate the dyestuff in the form of a dry product, 90 parts of water are added to the mixture resulting from the preceding cyclization stage, then the mixture is acidified up to pH 1.5–2 with 38 parts by volume of 10 N hydrochloric acid. The insoluble dyestuff salt is filtered and washed with 250 parts of water containing 40 parts of sodium chloride. After oven-drying at 60° C. in vacuo, 66.5 parts are obtained of a highly pure dyestuff corresponding to the formula:

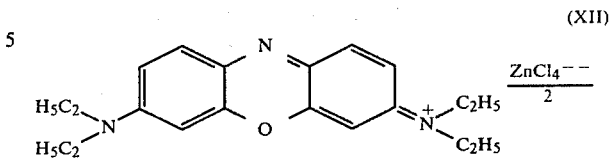
(XII)

The chemical yield from the synthesis, determined by spectrophotometry metering in the visible range compared with the reference dyestuff, which is recrystallized and pure (nitrate) and has the following characteristics log ε=4.9532 at 655 nm in 30% CH₃COOH, rises to 86%. The obtained dyestuff dyes polyacrylonitrile fibers a very vivid greenish-blue shade.

If, instead of isolating the dyestuff in the dry form, it is desirable to obtain it in the form of a stable solution which can be used directly in dyeing, it is sufficient, when the formation of the dyestuff is completed, to filter the ammoniacozinc phosphate which is formed during the cyclization reaction and which is very insoluble in water. After the latter has been washed with water and the filtrates have been mixed, 185 parts are obtained of a solution of the dyestuff of the formula:

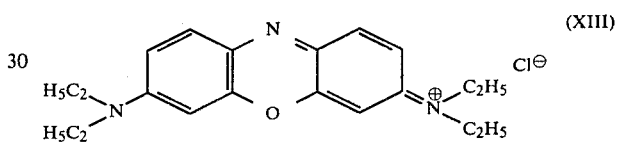
(XIII)

(same yield as above).

When the operation is conducted under the same conditions, but without adding acetic anhydride, it is ascertained that there is no formation of a dyestuff, even after a very prolonged time of contact.

EXAMPLE 2

In an open container, 300 parts by volume of methyl isobutyl ketone are mixed with 16.5 parts of 3-diethylamino-phenol and 30 parts by volume of acetic anhydride. Within 3 hours with stirring and at a temperature of 24° to 27° C., 20.8 parts of 4-nitroso-3-methoxy-N,N-diethylaniline are then introduced, which is preferably used in the form of an aqueous paste having 45/55% of dry extract. Stirring is again effected for one hour to complete the formation of the basic oxazine dyestuff. 35 parts of water at 25° C. are then introduced and the mixture is left to settle for approximately 60 minutes, then the lower aqueous phase containing the dyestuff is drawn off. A second extraction of the dyestuff is effected under the same conditions as above.

The mixing of the two aqueous extracts of dyestuff provides 110 parts of a solution containing 30.2 parts of the dyestuff of the formula:

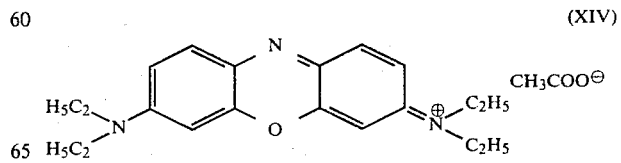
(XIV)

This solution, stable to storage, is directly usable for the dyeing of polyacrylonitrile or anion-modified polyester fibers. The chemical yield, determined as indicated in Example 1, is 79%.

According to one variant, the dyestuff of formula (XIV) may also be obtained in the form of a powder by directly drying the mixture of the two aqueous extracts by the atomization process known per se.

The dyestuff may also be isolated in powder form by precipitating it from the mixture of the two aqueous extracts by means of 11 parts of sodium nitrate. Stirring is effected for 30 minutes at 18°-22° C., then the dyestuff salt is filtered and dried at 60° C. in vacuo. The dyestuff of the formula:

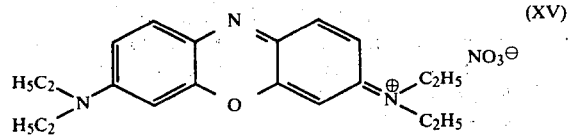

is thus obtained in a very pure form.

The methyl isobutyl ketone, which served as a diluent for the condensation-cyclization reaction and which is not miscible with water, may be recovered very easily by subjecting it to two successive washes, followed by settling, with, first of all, 100 parts of water containing 10 parts by volume of 10 N hydrochloric acid, then, the second time, with 50 parts of water. The solvent thus treated is directly usable for a new operation. It is therefore unnecessary and useless to effect a distillation so that all the preparation is effected at low temperature, and this constitutes a significant advantage at the industrial level.

EXAMPLE 3

When the operation is conducted as in Example 2, except that acetic anhydride has been replaced by the same quantity of propionic anhydride, a solution is obtained of the dyestuff of the formula:

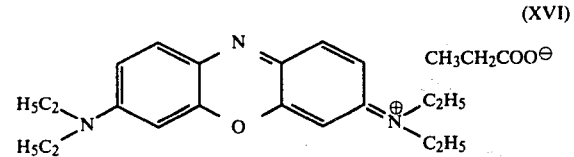

EXAMPLE 4

Introduced within 20 minutes, at a temperature of between 5° and 15° C., into a solution of 71.6 parts of 3-methoxydiethylaniline and 57 parts of zinc chloride in 200 parts by volume of 95% ethanol and 80 parts by volume of acetic acid are 55.2 parts by volume of an aqueous solution of 50% sodium nitrite. Stirring is again effected for 2 hours at 15° C. to complete the nitrosation reaction, then a solution of 81 parts of 3-o-toluidino-phenol in 100 parts by volume of ethanol is added. Then, within one hour, without exceeding 25° C., 48 parts by volume of acetic anhydride are poured in, then the intermediate metallic complex, which, scarcely soluble in the medium, has crystallized and corresponds to the following probable formula:

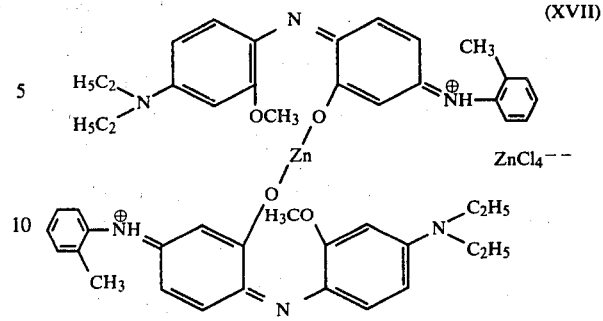

is isolated by filtration.

This metallic complex is taken up, in its wet form, into a mixture of 51 parts of water, 510 parts of 3-ethoxy-ethanol and 55 parts of diammonium hydrogen phosphate. Stirring is effected for 3 hours at 20°-22° C., then 380 parts of water are added and the oxazine dyestuff is isolated by introducing 77 parts by volume of 10 N hydrochloric acid and 260 parts of sodium chloride. After filtration, washing with 500 parts of water saturated with sodium chloride and drying at 60° C. in vacuo, 103 parts of the oxazine dyestuff of the formula:

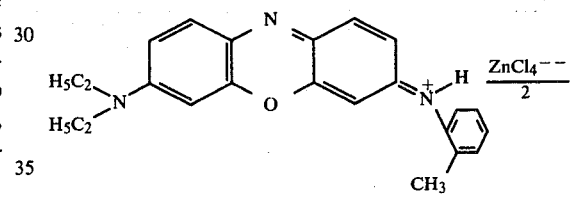

are obtained in a very pure form and this dyestuff dyes polyacrylonitrile fibers very brilliant neutral blue tones.

EXAMPLE 5

8.25 parts of 3-diethylamino-phenol and 8.6 parts of zinc chloride are dissolved in 60 parts by volume of ethanol and 14.5 parts by volume of 10 N hydrochloric acid. The mixture is cooled to 5° C., then 6.9 parts by volume of an aqueous 50% solution of sodium nitrite are introduced within 15 minutes and stirring is again effected for 30 minutes to complete the nitrosation reaction. 6.9 parts of 2,4-diamino-anisole in 10 parts of ethanol are then added, then 10 parts by volume of acetic anhydride are poured in within one hour, without exceeding 25° C. The oxazine dyestuff is formed very rapidly; it is precipitated by the addition of 200 parts of water saturated with sodium chloride, then filtered and dried at 60° C. in vacuo. Thus 14.5 parts are obtained of the dyestuff of the following formula:

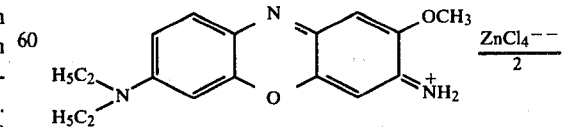

EXAMPLE 6

Within 30 minutes, while maintaining the temperature between 15° and 18° C. by the addition of ice, 41.6 parts by volume of an aqueous solution of 50% sodium nitrite are poured into a mixture containing 62.6 parts of β-hydroxyethyl ether of 3-diethylamino-phenol, 43.2 parts of zinc chloride, 54 parts of acetic acid and 60 parts of ice. After stirring for one hour, 50.8 parts of 3-diethylamino-phenol are added, then, within one hour, while maintaining the temperature at 25° C. by the addition of ice, 30.6 parts of acetic anhydride are poured in. After 50 parts of sodium chloride have been added and after the mixture has been stirred for 30 minutes, the metallic complex which is formed (weight: 130 parts) is filtered, washed and dried.

To convert this complex into an oxazine dyestuff, it is stirred for two hours at 25°–28° C. in a solution of 65 parts of diammonium hydrogen phosphate in 350 parts of water. The ammonia-cozinc phosphate which is formed is separated by filtration and washed with water to obtain 1,500 parts of a dyestuff solution. The latter is isolated by adding 154 parts of sodium nitrate to the solution. After filtration and drying, 85 parts are obtained of the dyestuff of formula (XV).

EXAMPLES 7 TO 43

The following table gives other examples of dyestuffs of formula (I) prepared according to the process of the invention.

N,N-diethylaniline, 1.4 parts of zinc chloride and 4.5 parts of sodium acetate.

The metallic complex of formula (XI), which is formed and which has precipitated from the medium during the addition of the acetyl chloride, is not isolated but is immediately cyclized. For this, 60 parts of water are added to the medium, the pH is adjusted to 7.0 with a little 10 N sodium hydroxide, 2 parts of diammonium hydrogen phosphate are introduced and the mixture is stirred for 2 hours at ambient temperature. The ammoniacozinc phosphate which is formed is then separated by filtration, then the oxazine dyestuff is precipitated from the filtrate by means of 1.3 parts of sodium nitrate.

After filtration and drying, 3.07 parts are obtained of the dyestuff of formula (XV). The metering in spectrophotometry according to the method described in Example 1 permits the yield of this synthesis, which rises to 75.6%, to be determined.

What is claimed is:

1. Process for the preparation of a basic oxazine dyestuff of the formula:

TABLE

| Ex | $R_1$ | $R_2$ | $R_3$ | $R_4$ | $R_5$ | $R_6$ | $R_7$ |
|---|---|---|---|---|---|---|---|
| 7  | methyl | methyl | methyl | —CH$_2$CH$_2$Cl | butyl | H | H |
| 8  | " | " | " | —CH$_2$CH$_2$CN | ethyl | " | " |
| 9  | " | " | H | H | H | ethoxy | " |
| 10 | " | " | methyl | " | " | methoxy | " |
| 11 | " | " | methoxy | " | " | " | " |
| 12 | " | " | H | " | " | methyl | " |
| 13 | " | " | " | —CH$_2$CH$_2$CN | " | ethoxy | " |
| 14 | ethyl | ethyl | " | H | " | " | " |
| 15 | " | " | " | —CH$_2$CH$_2$OH | " | " | " |
| 16 | methyl | methyl | " | methyl | methyl | H | " |
| 17 | ethyl | ethyl | " | —CH$_2$CH$_2$CN | H | methyl | " |
| 18 | " | " | " | " | " | methoxy | " |
| 19 | " | " | " | " | methyl | H | " |
| 20 | H | o-tolyl | " | ethyl | H | methyl | " |
| 21 | " | " | " | phenyl | " | H | " |
| 22 | " | " | " | H | " | methyl | " |
| 23 | " | " | " | —CH$_2$CH$_2$CN | —CH$_2$CH$_2$CN | " | " |
| 24 | ethyl | ethyl | " | methyl | methyl | " | " |
| 25 | H | " | methyl | " | " | " | " |
| 26 | " | " | " | H | H | methoxy | " |
| 27 | " | phenyl | " | ethyl | " | methyl | " |
| 28 | methyl | methyl | H | —CH$_2$CH$_2$CN | " | methoxy | " |
| 29 | H | phenyl | " | " | " | " | " |
| 30 | —CH$_2$CH$_2$CN | —CH$_2$CH$_2$CN | " | ethyl | ethyl | H | " |
| 31 | ethyl | ethyl | " | " | —CH$_2$CH$_2$CN | " | " |
| 32 | H | methyl | methyl | —CH$_2$CH$_2$CN | " | " | " |
| 33 | ethyl | ethyl | H | methyl | —C$_2$H$_4$CONH$_2$ | " | " |
| 34 | " | " | " | —CH$_2$CH$_2$CN | —CH$_2$CH$_2$CN | " | methyl |
| 35 | " | " | " | ethyl | —C$_2$H$_4$CO$_2$—C$_2$H$_5$ | " | H |
| 36 | " | " | " | " | H | methyl | " |
| 37 | " | " | " | H | " | " | " |
| 38 | methyl | methyl | " | ethyl | —CH$_2$CH$_2$OH | H | " |
| 39 | H | o-tolyl | " | " | ethyl | " | " |
| 40 | ethyl | ethyl | " | phenyl | H | " | " |
| 41 | methyl | methyl | methyl | " | " | " | " |
| 42 | " | " | H | H | " | methoxy | " |
| 43 | " | " | " | " | " | methyl | " |

EXAMPLE 44

0.8 part of acetyl chloride is introduced within one hour at ambient temperature into a stirred mixture of 40 parts by volume of methanol, 1.65 parts of 3-diethylamino-phenol, 2.08 parts of 4-nitroso-3-methoxy-

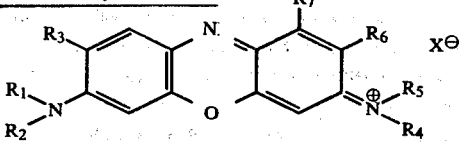

in which $R_1$ represents:

hydrogen,
unsubstituted alkyl, alkenyl or aralkyl,
alkyl substituted by halogen, hydroxy, cyano, carbamoyl, alkoxy or alkoxycarbonyl, or
aralkyl substituted by halogen, alkyl, trifluoromethyl, cycloalkyl, hydroxy, alkoxy, aralkoxy, cycloalkoxy, aryloxy, carboxy, acyl, acyloxy, acylamino, acylalkoxycarbonyl, nitro, cyano, carbamoyl, sulfamoyl, amino, alkylamino, dialkylamino, arylamino, mercapto, alkylmercapto, arylmercapto, alkylsulfonyl or arylsulfonyl;

$R_2$ represents:
unsubstituted alkyl, alkenyl, cycloalkyl, aryl or aralkyl,
alkyl substituted by halogen, hydroxy, cyano, carbamoyl, alkoxy or alkoxycarbonyl, or
aryl or aralkyl substituted by halogen, alkyl, trifluoromethyl, cycloalkyl, hydroxy, alkoxy, aralkoxy, cycloalkoxy, aryloxy, carboxy, acyl, acyloxy, acylamino, acylalkoxycarbonyl, nitro, cyano, carbamoyl, sulfamoyl, amino, alkylamino, dialkylamino, arylamino, mercapto, alkylmercapto, arylmercapto, alkylsulfonyl or arylsulfonyl;

$R_3$ represents hydrogen, alkyl or alkoxy;

$R_4$ represents:
hydrogen,
unsubstituted alkyl, aryl or aralkyl,
alkyl substituted by halogen, hydroxy, cyano, carbamoyl, alkoxy or alkoxycarbonyl, or
aryl or aralkyl substituted by halogen, alkyl, trifluoromethyl, cycloalkyl, hydroxy, alkoxy, aralkoxy, cycloalkoxy, aryloxy, carboxy, acyl, acyloxy, acylamino, acylalkoxycarbonyl, nitro, cyano, carbamoyl, sulfamoyl, amino, alkylamino, dialkylamino, arylamino, mercapto, alkylmercapto, arylmercapto, alkylsulfonyl or arylsulfonyl;

$R_5$ represents hydrogen, unsubstituted alkyl or alkyl substituted by halogen, hydroxy, cyano, carbamoyl, alkoxy or alkoxycarbonyl;

$R_6$ represents hydrogen, alkyl or alkoxy;

$R_7$ represents hydrogen or alkyl or forms with $R_6$ a fused benzene ring; and $X^\ominus$ represents an anion, which process comprises reacting in aqueous medium, organic medium or mixture thereof:

(a) a nitroso compound of formula (II) with an aminophenol of formula (III):

(II)    (III)

in which $R_1$ to $R_5$ and $R_7$ have the same meanings as above, $R'_6$ represents hydrogen or alkyl, and $R_8$ represents unsubstituted alkyl or alkyl substituted by hydroxy, or (b) a nitroso compound of formula (IV) with a compound of formula (V):

(IV)    (V)

in which $R_1$, $R_2$, $R_4$, $R_5$ and $R_6$ have the same meanings as above, $R'_3$ and $R'_7$ each represents hydrogen or alkyl, and $R_9$ represents alkoxy, unsubstituted amino or amino substituted by one or two alkyl, said reaction being effected without its being necessary to raise the temperature above the ambient temperature and in the presence of an anhydride of a carboxylic acid of the formula:

$$Y-\overset{O}{\underset{\|}{C}}-O-\overset{O}{\underset{\|}{C}}-Y'$$

in which Y represents unsubstituted linear or ramified alkyl containing 1 to 6 carbon atoms, linear or ramified halogeno-substituted alkyl containing 1 to 6 carbon atoms, unsubstituted phenyl or phenyl carrying up to three substituents selected from the halogen atoms and the nitro, alkyl and alkoxy groups, Y' is hydrogen or has the same significance as Y, said anhydride being used in a quantity at least equal to the stoichiometry.

2. Process according to claim 1 wherein the operation is conducted without heating.

3. Process according to claim 1 wherein the anhydride is formed in situ.

4. Process according to claim 1 wherein the anhydride is added to a mixture of a nitroso compound of formula (II) or (IV) and a compound of formula (III) or (V) respectively, in a liquid medium.

5. Process according to claim 1 wherein the nitroso compound of formula (II) or (IV) is introduced into a mixture of the compound of formula (III) or (V) respectively and the anhydride in a liquid medium.

6. Process according to claim 1 for the preparation of said dyestuff in which $X^\ominus$ is the $YCOO^\ominus$ and/or $Y'COO^\ominus$ anion, wherein the nitroso compound (II) or (IV) is used in a non-salified form.

7. Process according to claim 1 wherein the nitroso compound (II) or (IV) is prepared in the condensation-cyclization medium itself.

8. Process according to claim 1 for the preparation of said dyestuff in which $R_1$, $R_2$, $R_4$ and $R_5$ each represent ethyl and $R_3$, $R_6$ and $R_7$ each represent hydrogen.

9. Process according to claims 1, 2, 3, 4, 5, 7 or 8 wherein the operation is conducted in the presence of a metallic salt.

10. Process according to claim 9 in which the metallic salt is zinc chloride.

11. Process according to claim 9 wherein any intermediate metallic complex formed is treated in neutral to slightly alkaline medium by a compound capable of precipitating or complexing the metal.

12. Process according to claim 10 wherein any intermediate metallic complex formed in treated in neutral to slightly alkaline medium by a compound capable of precipitating or complexing the metal.

13. Process according to claim 12 wherein a sodium, potassium or ammonium phosphate is used.

14. Process according to claim 1, 2, 3, 4, 5, 6, 7 or 8 in which the anhydride is acetic anhydride.

15. Process according to claim 9 in which the anhydride is acetic anhydride.

16. Process according to claim 10 in which the anhydride is acetic anhydride.

17. Process according to claim 13 in which the anhydride is acetic anhydride.

* * * * *